Figure 1:
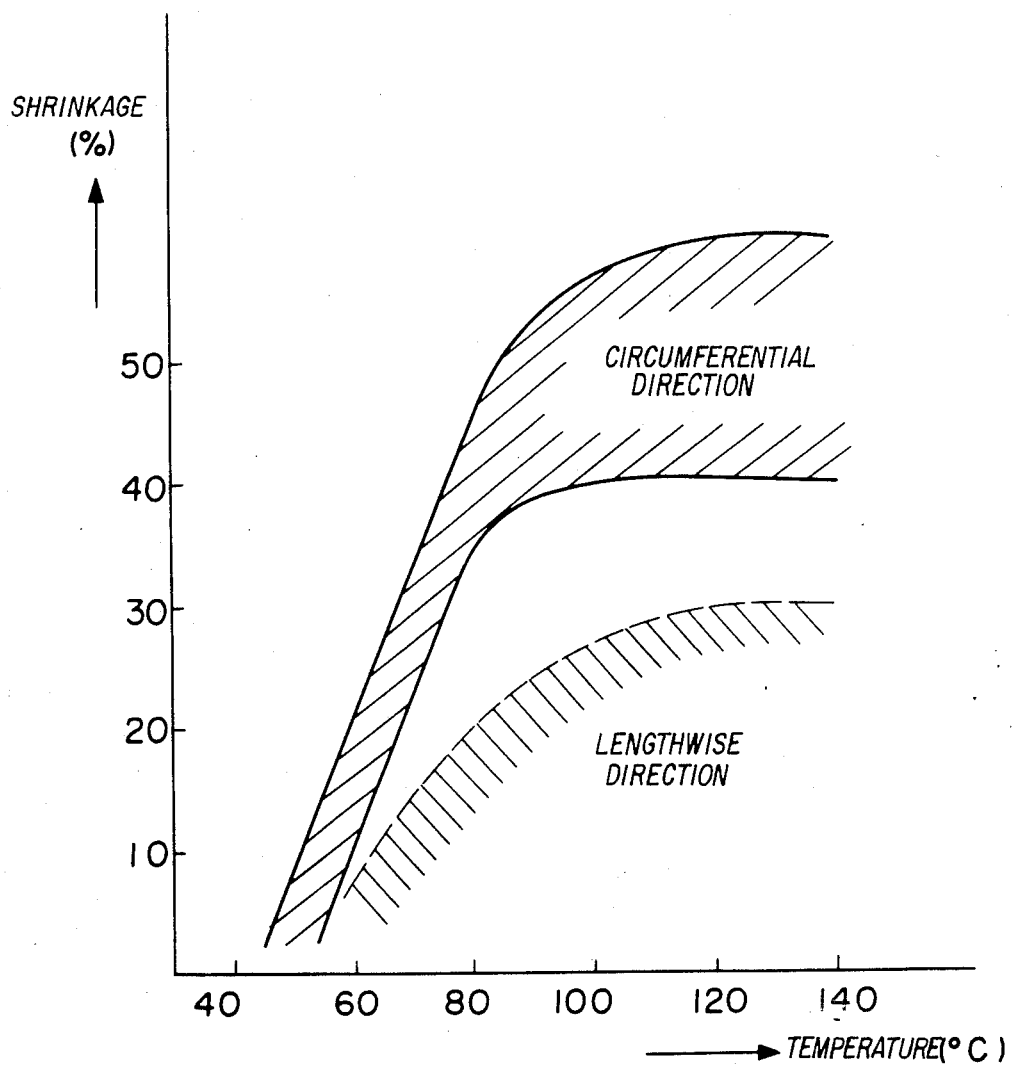

United States Patent [19]

Hirobe et al.

[11] Patent Number: 4,621,450
[45] Date of Patent: Nov. 11, 1986

[54] HEAT SHRINKABLE TUBE OF POLYVINYL CHLORIDE FOR PROTECTING STEM OF CUT FLOWERS

[75] Inventors: Kiyokazu Hirobe, Nagahama; Naokuni Tsujii, Shiga, both of Japan

[73] Assignee: Mitsubishi Plastics Industries Limited, Tokyo, Japan

[21] Appl. No.: 713,802

[22] Filed: Mar. 20, 1985

[30] Foreign Application Priority Data

Jun. 7, 1984 [JP] Japan ................. 59-117370

[51] Int. Cl.⁴ .................... A01C 1/00; B29C 41/00
[52] U.S. Cl. ......................... 47/58; 47/DIG. 11; 264/230; 428/36; 138/178
[58] Field of Search .............. 174/DIG. 8; 428/36; 138/98, 103, 177, 178; 264/230; 47/58, DIG. 11

[56] References Cited

U.S. PATENT DOCUMENTS

| | | | |
|---|---|---|---|
| 3,226,807 | 1/1966 | Orr | 174/DIG. 8 |
| 3,294,941 | 12/1966 | Mullen | 174/DIG. 8 |
| 3,731,130 | 5/1973 | Dutta | 174/DIG. 8 |
| 4,343,844 | 8/1982 | Thayer | 174/DIG. 8 |

FOREIGN PATENT DOCUMENTS 2838975 5/1980 Fed. Rep. of Germany .... 47/DIG. 11

Primary Examiner—John E. Kittle
Assistant Examiner—James J. Seidleck
Attorney, Agent, or Firm—Oblon, Fisher, Spivak, McClelland & Maier

[57] ABSTRACT

A heat shrinkable tube of polyvinyl chloride for covering the stem of cut flowers, said heat shrinkable tube having the following properties:

(a) a shrinkage at 60° C. of 8% or less in the lengthwise direction, and from 10% to 20% in the circumferential direction;
(b) a shrinkage at 80° C. of 20% or less in the lengthwise direction, and from 35% to 45% in the circumferential direction;
(c) a shrinkage-initiating temperature in the circumferential direction of from 40° C. to 55° C;
(d) a softening temperature of from 40° C. to 55° C; and
(e) a thickness of from 50 μm to 100 μm.

4 Claims, 1 Drawing Figure

HEAT SHRINKABLE TUBE OF POLYVINYL CHLORIDE FOR PROTECTING STEM OF CUT FLOWERS

This invention relates to a heat shrinkable tube for protecting stems of cut flowers.

Cut flowers such as barberton daisy (*Gerbera Jamesonii*) having a long stem with a relatively heavy flower head tend to cause bending of their stems (or shanks) owing to weight of the flower head while these flowers are being arranged in a flower vase, and the flower head readily face downward. In order to avoid such undesirable phenomenon, it has so far been a practice to reinforce the stem of the flower by winding wire on and around the stem, or passing wire in and through the hollow part of the stem. These reinforcing methods, however, were apt to readily cause the stem to be damaged and yet the wire to drop off the stem. Further, with the first-mentioned method, the wire wound on and around the flower stem was not pleasing to the sight.

It is therefore an object of the present invention to provide a heat shrinkable tube which is capable of preventing the flower head from facing downward, when protective covering is applied to the flower stem.

It is another object of the present invention to provide a heat shrinkable tube which is capable of, on the one hand, shrinking to a satisfactory degree at a low temperature and for a short length of time so as not to cause the cut flowers to be damaged on account of heat applied at the time of covering the stem with the protective tube, and, on the other hand, of not bringing about spontaneous shrinkage during storage of the tube.

According to the present invention, in general aspect of it, there is provided a heat shrinkable tube of polyvinyl chloride for covering the stem of cut flowers, said heat shrinkable tube having the following properties:

(a) a shrinkage at 60° C. of 8% or less in the lengthwise direction, and from 10% to 20% in the circumferential direction;

(b) a shrinkage at 80° C. of 20% or less in the lengthwise direction, and from 35% to 45% in the circumferential direction;

(c) a shrinkage-initiating temperature in the circumferential direction of from 40° C. to 55° C.;

(d) a softening temperature of from 40° C. to 55° C.; and (e) a thickness of from 50 μm to 100 μm.

Now, the present invention will be described in detail with reference to the preferred embodiments.

In the accompanying drawing, FIG. 1 is a graphical representation showing a temperature versus shrinking property of the heat shrinkable tube according to the present invention.

For covering the stem of cut flowers without causing damage to them by the heat shrinking process, there may be contemplated several conditions such as tube material, heating temperature, heating time, and so forth. It has been found out that good result could be obtained from heat-treatment of a PVC (polyvinyl chloride) tube for a short length of time and at a temperature of from 70° C. to 90° C. or so (this is a temperature of the tube per se, and the temperature of the stem portion of the cut flower is considered to be lower than the tube temperature, because of the water content in it).

Accordingly, a preferred material for the purpose should be such one that brings about abrupt heat shrinkage at a temperature range of from about 60° C. to about 80° C. In this case, the shrinkage of the tube in its axial (or lengthwise) direction should preferably be smaller than its shrinkage in the circumferential direction thereof, as far as possible. To satisfy this condition, the shrinkage of the tube in its lengthwise direction should be made 8% or lower at 60° C. and 20% or lower at 80° C., or, preferably, 5% or lower at 60° C. and 10% or lower at 80° C. When the shrinkage in the lengthwise direction exceeds the above-mentioned numerical values, the tube length would become short at the time of its shrink-covering with the result that a thinner portion of the stem beneath the flower head is not covered at all, whereby the most vulnerable part of the flower cannot be protected with the tube covering.

On the other hand, the upper limit of the shrinkage of the tube in its circumferential direction is required to be set at 20% at 60° C. and 45% at 80° C. Beyond these numerical values, tightening force of the tube to be applied to the stem of the flower at the time of its covering on the stem by shrinkage becomes too strong with an apprehension that the stem would be impaired.

By the way, as to the shrinkage of the tube in its lengthwise direction, it should be noted that, when the tube is formed by extrusion through an annular die, a tensile force is unavoidably imparted to the tube in its lengthwise direction, on account of which the tube tends to shrink to a certain degree without performing on it any intensional operation of the axial elongation. In order to reduce the lengthwise shrinkage of the tube, it may be effective to perform the elongation in its circumferential direction by making the speed of forwarding nip rollers at the time of the circumferential elongation of the tube faster than the speed of take-up nip rollers, while relaxing the tube in its lengthwise direction.

A shrinkage-initiating temperature of the tube in its circumferential direction is associated with the spontaneous shrinkage of the tube. While the shrinking should desirably be done at as lower a temperature as possible, in case the heat shrinkable tube is applied on to the stem of the cut flower, if the tube used shrinks at an extremely low temperature, it would bring about spontaneous shrinkage during transportation and storage of the tube to cause various problems in its use such as slackening, wrinkling, size-reduction, etc. of the tube. Therefore, as already mentioned in the foregoing, the heat shrinkable tube according to the present invention should preferably have its shrinkage in the circumferential direction of 10% or more at 60° C. and 35% or more at 80° C., and further an initiating temperature for its circumferential shrinkage of from 40° C. to 55° C., or preferably from 40° C. to 50° C. If this shrinkage-initiating temperature is lower than 40° C., the above-mentioned spontaneous shrinkage takes place depending on the atmospheric temperature and the storage condition of tube. On the other hand, when the shrinkage-initiating temperature is higher than 55° C., it becomes difficult to obtain the shrinkage of 10% or more at 60° C. and 35% or more at 80° C. with the consequence that there is no choice but increasing the shrink-covering temperature. However, this increase in the shrink-covering temperature should be avoided, because it would damage the cut flowers.

For obtaining the heat shrinkable tube having the above-mentioned shrinking properties, a softening temperature of the tube is closely related. For the purpose of the present invention, use of a material having its softening temperature of from 40° C. to 55° C. is preferred. Such material is obtained by mixing 100 parts by weight of polyvinyl chloride (PVC) and 6 to 12 parts by weight or so of a plasticizer such as dioctyl phthalate, etc. With a material having its softening temperature not reaching 40° C., the shrinkage-initiating temperature in the circumferential direction becomes low to readily bring about the spontaneous shrinkage. On the other hand, with a material having its softening temperature exceeding 55° C., the shrinkage-initiating temperature becomes high with the consequent difficulty in obtaining the above-mentioned shrinkage at such relatively low temperature. As the result of this, if the shrink-covering temperature is increased, it would inevitably cause mal-effect to the cut flowers.

Incidentally, it is important to note that the tube formed of the above-mentioned substance (before its elongation) to abruptly be elongated in the radial direction in a short length of time to its ultimate size at an elongation temperature of from 90° C. to 100° C. and at a rate of elongation of from 1.8 to 2.3 times or so, and then the thus elongated tube is quenched. In this way, there can be obtained a desired tube which does not shrink at 40° C., but abruptly shrinks at a temperature range of from 60° C. to 80° C.

Thickness of the heat shrinkable tube according to the present invention is in a range of from 50 $\mu m$ to 100 $\mu m$. While the softening temperature of the material should preferably be in a range of from 40° C. to 55° C., as mentioned above, in view of its shrinking property, if the cut flower is covered with the same material having its thickness not reaching 50 $\mu m$, the protective effect of the tubular material, when it is covered on the stem of the cut flower, is small (i.e., the stem is easily bent or broken). On the contrary, if the thickness of the tubular material exceeds 100 $\mu m$, there arise various shortcomings such that the material is uneconomically wasted, a longer time is taken for heat transmission, and the shrinking speed of the tube becomes low, hence the heating time is prolonged, which apprehensively causes damage to the cut flower.

Since the heat shrinkable tube according to the present invention is applied to the cut flower for appreciation, it is important that, when the cut flower is covered with the heat shrinkable tube, it should not give rise to a sense of incompatibility to the eyes, but should give natural feeling of the stem. For this purpose, it is necessary that the tube has a certain degree of transparency so as to enable everyone to see the stem, as it is, through the tube covering, and yet has no luster on its surface. More specifically, the tube should preferbly have a parallel light ray transmittance of 50% or higher (a yardstick for transparency) and a surface glossiness of from 45 to 85. In this case, the tube may be tinged in green, etc.

The following are examples of methods for manufacturing the heat shrinkable tube having its outer appearance and properties as mentioned above.

(a) 1.5 to 3 parts by weight of a metal fatty acid salt (for example, a salt of a fatty acid such as stearic acid, lauric acid, ricinoleic acid, naphthenic acid, and so forth, and a metal such as cadmium, barium, calcium, zinc, lead, and so forth) is mixed with 100 parts by weight of polyvinyl chloride (PVC), and then the mixture is subjected to extrusion at an extrusion temperature lower than usual (e.g. 190° C. or below in terms of temperature of a resin to be extruded), whereupon a matted tube with coarsened surface is obtained.

(b) With 100 parts by weight of PVC, 5 to 30 parts by weight of a resin having poor compatibility with PVC is admixed, and the mixture is melted under heat, followed by extrusion. As the resin having poor compatibility with PVC, there may be exemplified a PVC having a higher degree of polymerization than the PVC to be the principal constituent of the mixture, and impact modifiers such as ABS, MBS, etc. with high content of butadiene (20% by weight or more).

Thus, the heat shrinkable tube with coarsened surface to be obtained by blending of different kinds of material does not lose its matt when it is shrunken, which is therefore favorable for the purpose of the present invention. In addition, since the inner surface of the tube is also rendered coarse, the severed end of the flat-folded tubular material can be easily made wide-open when it is to cover the stem of the cut flower. For other effect, deaeration within the tube becomes easy at the time of the shrink-covering. In the case of covering the stem of the cut flower with the heat shrinkable tube according to the present invention, use is made of a tube having an allowance in its circumferential direction of from 5% to 10% with respect to the circumferential length thereof. If this allowance is below 5%, working efficiency in insertion of the stem into the tube becomes poor. On the other hand, when the allowance exceeds 10%, the tube will have large room for it to shrink in the axial direction, and the outer appearance of the tube as shrunken becomes poor. The heating of the tube for its shrinking is done, in a short length of time, by blowing hot air to the covering tube by use of a dryer, or by immersing the tube into hot water to bring the tube to its temperature of from 70° C. to 90° C.

Flowers suitable for being covered with the heat shrinkable tube according to the present invention are gerbera, narscissus, tulip, and so forth.

With a view to enabling those persons skilled in the art to manufacture the heat shrinkable tube according to the present invention, the following example is presented. Note should be taken in this connection that the physical values of the tube were measured by the undermentioned methods.

(1) Shrinkage:

The heat shrinkable tube is placed in hot air circulation type constant temperature vessels, each being set at a predetermined temperature, and maintained therein for five minutes. After this, the tube is taken out of the vessel and cooled, followed by measurement of its dimensional changes.

$$\text{Shrinkage (\%)} = \frac{\text{Length before shrinkage} - \text{Length after shrinking}}{\text{Length before shrinking}} \times 100$$

(2) Shrinkage-initiating temperature:

A specimen is held by a clamp provided with a strain gauge in a state of no load. Temperature is elevated from a normal temperature at a rate of temperature increase of 5° C./min, and a temperature level, at which the distortion changes from expansion to contraction, is found.

(3) Softening temperature:
According to JIS K6745

(4) Parallel light ray transmittance (Tp):
According to JIS K6714

(5) Glossiness:
According to JIS Z8741. The glossiness of 60° when the value of a black glass plate is set at 100.

EXAMPLE

The following starting materials were prepared.
PVC ($\overline{P}=1100$): 100 wt. parts
Dioctyl phthalate: 10 wt. parts
Cadmium stearate: 1 wt. part
Barium stearate: 1 wt. part
Dibutyl tin maleate: 0.5 wt. part The above materials were mixed and melted. Then, the molten mixture was extruded through an annular die in a tubular form at a temperature of the resin of 185° C. After once cooling the shaped article, it was heated to 95° C., and, while the tubular product was being sent forward between two sets of forwarding nip rollers and take-up nip rollers, with a ratio of speed between them being 0.95, air is blown into the tube to elongate it in the radial direction with a rate of elongation of 2.0 times. The thus elongated tube was then brought into contact with a water-cooling former for limiting the outer diameter of the tube. As the result, the heat shrinkable tube of the following properties was obtained.

| Diameter: | | 9.5 mm | |
| --- | --- | --- | --- |
| Thickness: | | 80 μm | |
| Haze: | | 14% | |
| Parallel light ray transmittance: | | 76% | |
| Surface glossiness: | | 80 | |
| Shrinkage: | 60° C. | 80° C. | 100° C. |
| Axial | 5 | 9 | 11 |
| Circumferential | 16 | 42 | 45 |
| Initiating temperature for circumferential shrinkage | | 44° C. | |
| Softening temperature | | 44° C. | |

The thus obtained tube was put on the stem of barberton daisy with an allowance of 8% to a position immediately below its flower head, followed by heating it for a few seconds to shrink by blowing of hot air using a hand dryer. The outer appearance of the tube as shrunken was very good, i.e., the tube was in tight contact with the stem, and the covering could be done accurately upto the position immediately below the flower head. In this case, since the tube had been properly matted, it looked quite natural and the covering of the stem with the tube was not so noticeable.

While these flowers which had not been covered with the tube had their stems bent downward in three to five days, those which had been covered with the tube were observed not to have their stems bent down until the flowers were gone.

Although the invention has been described in detail with reference to a particular embodiment, it will be understood by those persons skilled in the art that the invention is capable of a variety of alternative embodiments within the spirit and scope of the invention as set forth in the appended claims.

We claim:
1. A method for protecting the stem of a cut flower, comprising:
(i) inserting the stem of the said cut flower into a heat shrinkable tube of polyvinyl chloride having the following properties:
 (a) a shrinkage at 60° C. of 8% or less in the lengthwise direction, and from 10% to 20% in the circumferential direction;
 (b) a shrinkage at 80° C. of 20% or less in the lengthwise direction, and from 35% to 45% in the circumferential direction;
 (c) a shrinkage-initiating temperature in the circumferential direction of from 40° C. to 55° C.;
 (d) a softening temperature of from 40° C. to 55' C.; and
 (e) a thickness of from 50 μm to 100 μm; and
(ii) heat shrinking said tube.

2. The method of claim 1, wherein said heat shrinkable tube is characterized by the following:
 (a) the transmittance of parallel light rays is 50% or higher, and
 (b) surface glossiness ranges from 45 to 85.

3. The method of claim 1, wherein said heat shrinking step is performed by (a) blowing hot air on said heat shrinkable tube or by (b) immersing said heat shrinkable tube into hot water, to bring said heat shrinkable tube to its temperature of from about 60° C. to about 80° C.

4. The method of claim 1, wherein said shrinkage in the lengthwise direction at 60° C. is 5% or less and wherein said shrinkage in the lengthwise direction at 80° C. is 10% or less.

* * * * *